United States Patent [19]

Morrow

[11] Patent Number: 4,854,267

[45] Date of Patent: Aug. 8, 1989

[54] MECHANICAL CAT LITTER BOX

[76] Inventor: Dan Morrow, 16711 Marsh Creek Rd., #67, Clayton, Calif. 94517

[21] Appl. No.: 219,393

[22] Filed: Jul. 15, 1988

[51] Int. Cl.⁴ .............................................. A01K 29/00
[52] U.S. Cl. ....................................... 119/1; 209/235; 209/374
[58] Field of Search ...................... 119/1, 15; 209/235, 209/374, 260

[56] References Cited

U.S. PATENT DOCUMENTS

| | | | |
|---|---|---|---|
| 3,100,474 | 8/1963 | Schneider | 209/374 X |
| 3,482,546 | 12/1969 | Anderson | 119/1 |
| 3,747,563 | 7/1973 | Brockhouse | 119/1 |
| 3,809,013 | 5/1974 | Rigdey et al. | 119/1 |
| 3,831,557 | 8/1974 | Elesh | 119/1 |
| 3,908,597 | 9/1975 | Taylor | 119/1 |
| 4,096,827 | 6/1978 | Cotter | 119/1 |
| 4,190,525 | 2/1980 | Menzel | 119/1 X |
| 4,312,295 | 1/1982 | Harrington | 119/1 |
| 4,325,822 | 4/1982 | Miller | 209/374 X |
| 4,327,667 | 5/1982 | Bilak | 119/1 |
| 4,359,966 | 11/1982 | Casino | 119/1 |
| 4,602,593 | 7/1986 | Gross | 209/374 X |
| 4,615,300 | 10/1986 | McDonough | 119/1 |
| 4,616,598 | 10/1986 | Burniski et al. | 119/1 |
| 4,649,578 | 3/1987 | Vargo | 119/1 X |

Primary Examiner—Richard J. Apley
Assistant Examiner—Robert W. Bahr
Attorney, Agent, or Firm—Bielen and Peterson

[57] ABSTRACT

A cat litter box with a mechanism for screening and draining reuseable, liquid-impervious granular material contained in the box, the box having a housing with a container, the container having an inner compartment with holes for holding the granular material and draining liquids, and an outer compartment for receiving drained liquids, the inner compartment having a screen, wherein the mechanism both raises the screen through the granular material to separate solid wastes, and tips the container to drain the liquid wastes and separated solids into a collection box for removal, and lowers the container, returning the screen to the inner compartment and redistributing the granular material over the screen before the container seats in the housing for reuse.

13 Claims, 5 Drawing Sheets

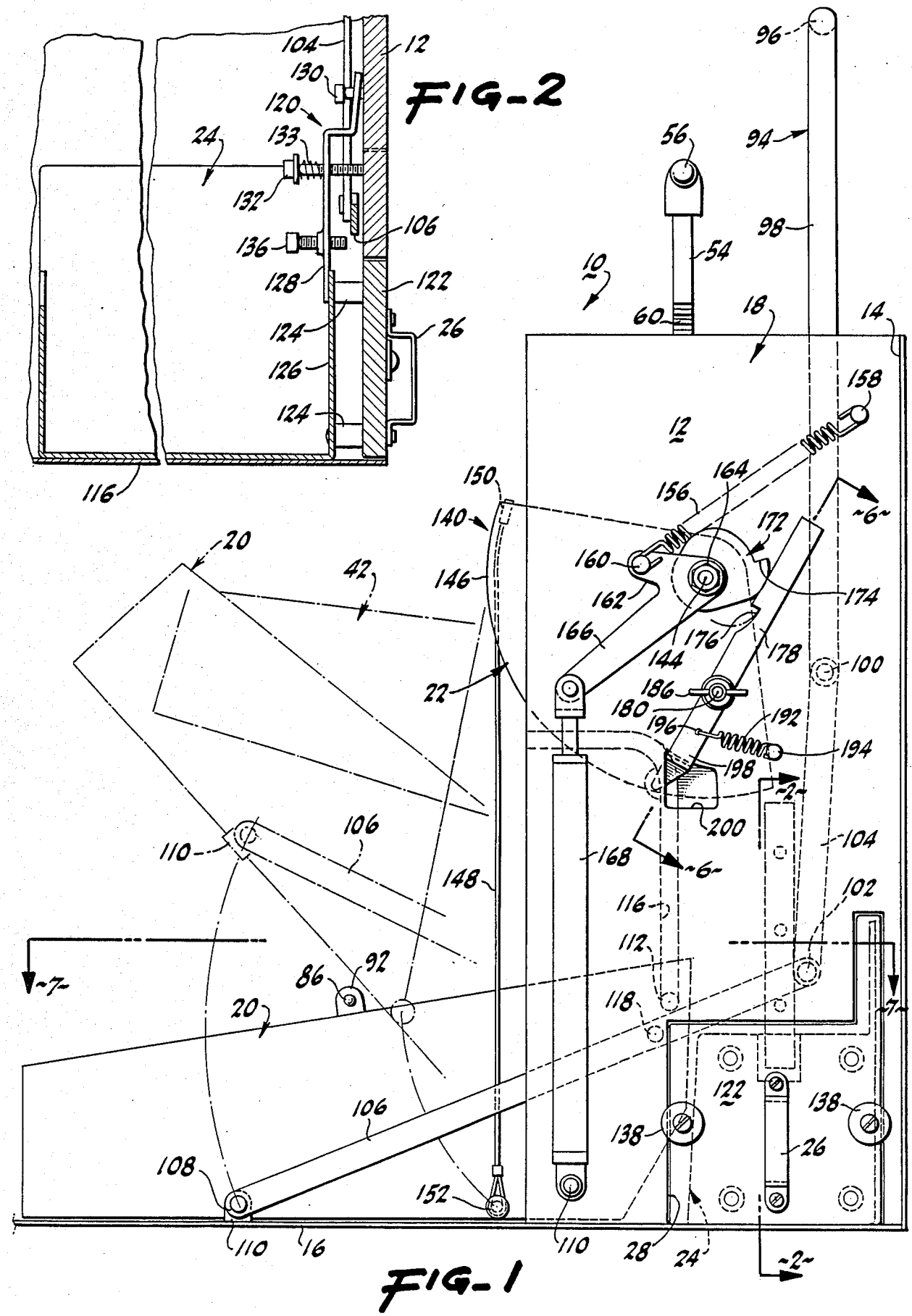

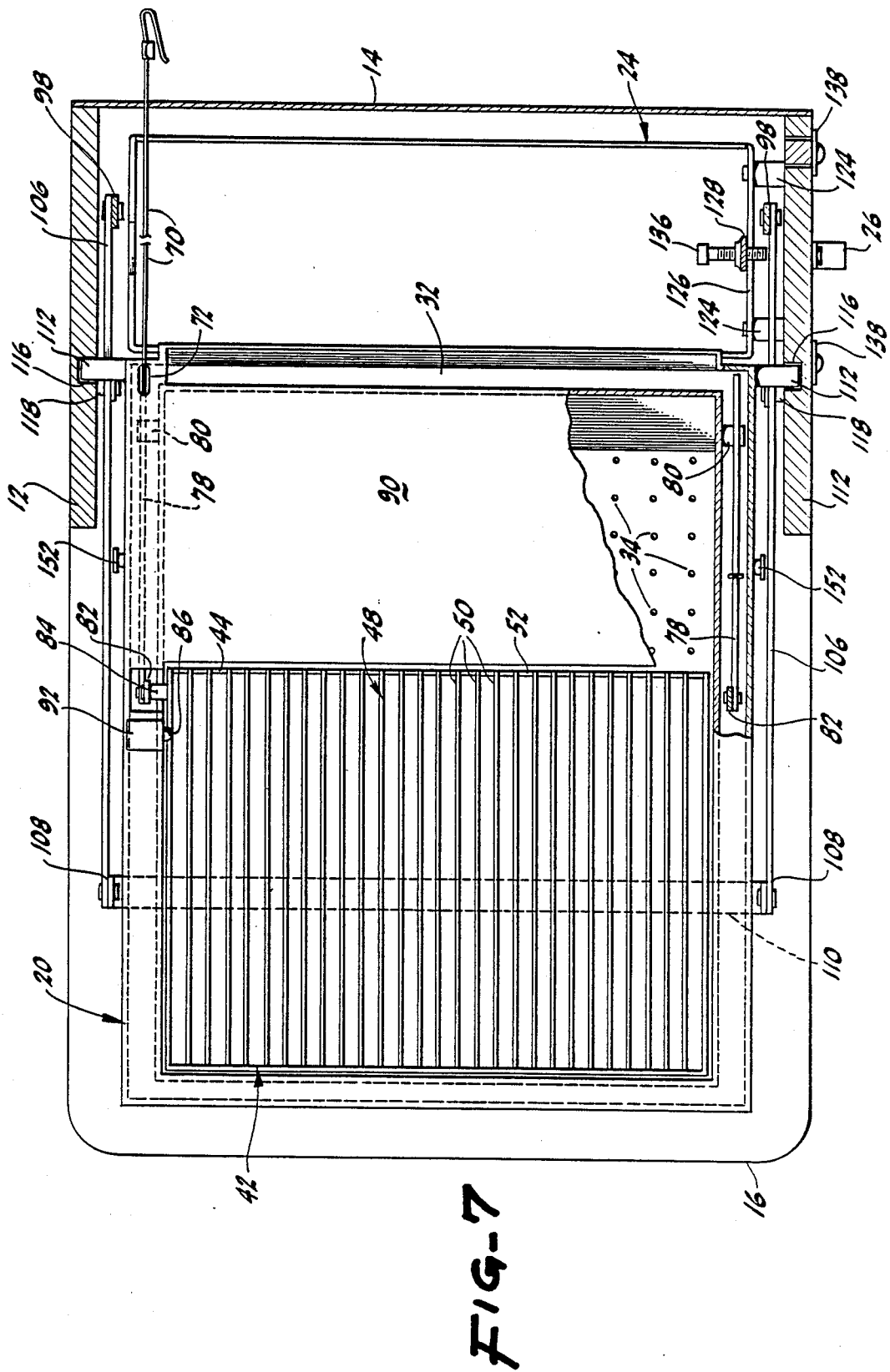

MECHANICAL CAT LITTER BOX

BACKGROUND OF THE INVENTION

This invention relates to a cat litter box with a mechanism for screening and draining reusable cat litter. Conventional cat litter boxes comprise an open container into which one or two inches of granular absorbent material is placed. Periodically the litter material is removed, discarded and replaced with new material. Optionally, special tools are provided to scoop and remove fecal matter to extend the life of the litter material. However, after being impregnated with cat urine, the absorbent litter material produces odor that requires the litter to be removed because it has become repugnant to either the cat or the cat's owner, or both.

Certain conveniences have been devised for assisting in the use and operation of a cat litter box. For example, in the patent of Ellis, U.S. Pat. No. 3,831,557, entitled CAT LITTER BOX, a molded container is disclosed that includes an impervious liner. Periodically, the liner and contained litter may be removed and discarded. The discarded liner is replaced with a new liner and new litter material is placed over the liner in the box. In the patents of Rigney, U.S. Pat. No. 3,809,013, entitled DISPOSAL INSERT FOR LITTER BOX, and Harrington, U.S. Pat. No. 4,312,295, entitled CAT BOX LITTER SCREENING DEVICE, a series of stacked liners with holes or apertures are provided to allow litter placed on top of the liners in a cat litter box to be screened such that bulk material is removed and the life of the remaining litter is extended. While certain odor absorbing or scent masking chemicals may be applied to the cat litter to further extend the life of the litter material, the material must usually be discarded well before it becomes saturated with urine.

The requirement to periodically change and remove the cat litter is a necessary nuisance in the ownership of a cat. The cat owner must be continually conscious of the existing supply of absorbent cat litter and must always be attentive to the current state of the litter box.

The mechanical cat litter box of this invention is designed to minimize the task of preparing a cat litter box and maintaining it in a condition that is usable and inoffensive to both cat and owner.

SUMMARY OF THE INVENTION

The mechanical cat litter box of this invention comprises a container for holding a nonabsorbent litter material that is periodically screened and drained by a mechanism actuated by simple push-pull hand bars. Instead of using a conventional absorbent litter material, the mechanical litter box of this invention operates by use of an impervious granular material that does not absorb the urine and moisture but allows such to drain through the material to the bottom of a container basin for collection and periodic removal. The litter box is equipped with a mechanism for straining the fecal matter from the container and draining the liquid matter from the basin.

The mechanical litter box of this invention includes a frame and a base pad. Positioned on the base pad and connected to the frame is a litter container having an inner and outer compartment. The litter is contained in the inner compartment. The outer compartment comprises a basin for collection of liquid that passes through holes in the bottom of the inner compartment. The litter container has side walls and a top with a front open portion and a rearward covered portion. Located in the forward portion of the container on the bottom of the inner compartment is a screen. The screen is sized and constructed to pass special granular litter material while retaining larger fecal material when the screen is drawn through the liquid impervious cat litter. In a two stage actuation process initiated by first and second plunger bars, the screen is lifted through the container and the container and displaced screen are raised and tipped to deposit the liquids and solids into a collection box. Once the liquids are drained and the solids deposited in the box, the actuating mechanism can be dropping the screen to the bottom of the container and redistributing the displaced impervious litter material over the screen as the litter container first shifts to a downward tilted position before dropping back onto the base pad. The collection box can be emptied in any sanitary facility such as a toilet.

When the self draining litter box of this invention is used, a non absorbent litter material can be used over and over. The litter material may comprise the colorful enamel coated pebble material sold in tropical fish stores, may comprise a coated expanded polymer that is light in weight, or any similar liquid-impervious granular material. During use of the mechanical litter box unit, the litter material can be repeatedly sprayed with a deodorized flush liquid from a conventional squeeze bottle. After draining through the impervious litter material the deodorizing liquid mixes with the collected urine in the under compartment or basin and is discharged with the urine during the mechanical flushing operation. The actuating mechanism detailed in the detailed description of the preferred embodiment mechanically accomplishes the various motions required to screen the litter and dispose of the solid and liquid effluent. Other equivalent mechanisms may of course be utilized to achieve the objects of this invention. The principal object of this invention as detailed hereafter is to provide a self-draining litter box having liquid-impervious litter that can be periodically screened of solid matter and drained of liquid matter by an easily operable actuating mechanism. The actuating mechanism may be electrical, hydraulic or mechanical. The description herein is directed to a mechanical means as a preferred embodiment.

BRIEF DESCRIPTION OF THE DRAWINGS

FIG. 1 is a side elevational view of the mechanical litter box unit.

FIG. 2 is a fragmented partial cross sectional view taken along the lines 2—2 in FIG. 1.

FIG. 7 is a cross sectional top view taken on the lines 7—7 in FIG. 1.

DETAILED DESCRIPTION OF THE PREFERRED EMBODIMENTS

Figure 3:
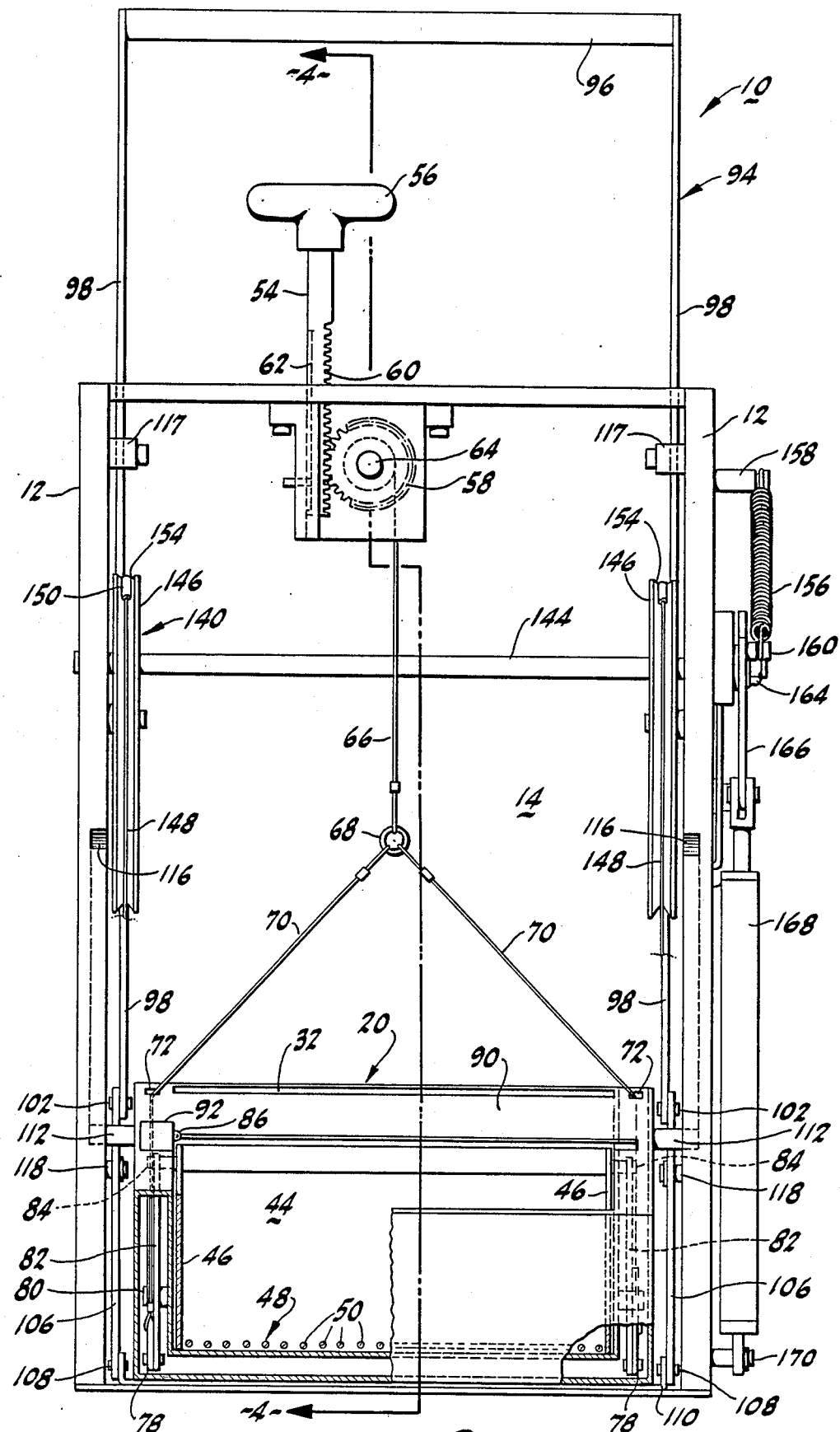
FIG. 3 is a front elevational view partially and cross section of the litter box unit of FIG. 1.
Figure 5:
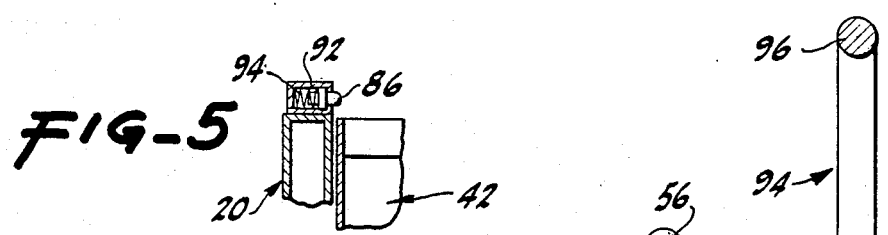
FIG. 5 is a cross sectional detailed view taken along lines 5—5 in FIG. 4.

Referring to FIGS. 1–7 of the drawings, the mechanical litter box unit, designated generally by the reference numeral 10 is shown in various views detailing its construction. The litter unit as shown in FIG. 1 is constructed with a pair of side frames 12 interconnected by thin back wall 14 and a base pad 16 which together form a housing 18 for a litter container 20 and an actuating mechanism 22. The actuating mechanism 22 includes several sub mechanisms for accomplishing the operations described hereinafter. In addition to the litter container 20 is a refuse collection box 24 mounted against the back wall 14 of the housing 18. The refuse collection box 24 has a handle 26 for removing the box through a contoured aperture 28 in one of the side frames 12 for withdrawing the refuse collection box 24 for periodic disposal of collected waste materials.

Figure 4:
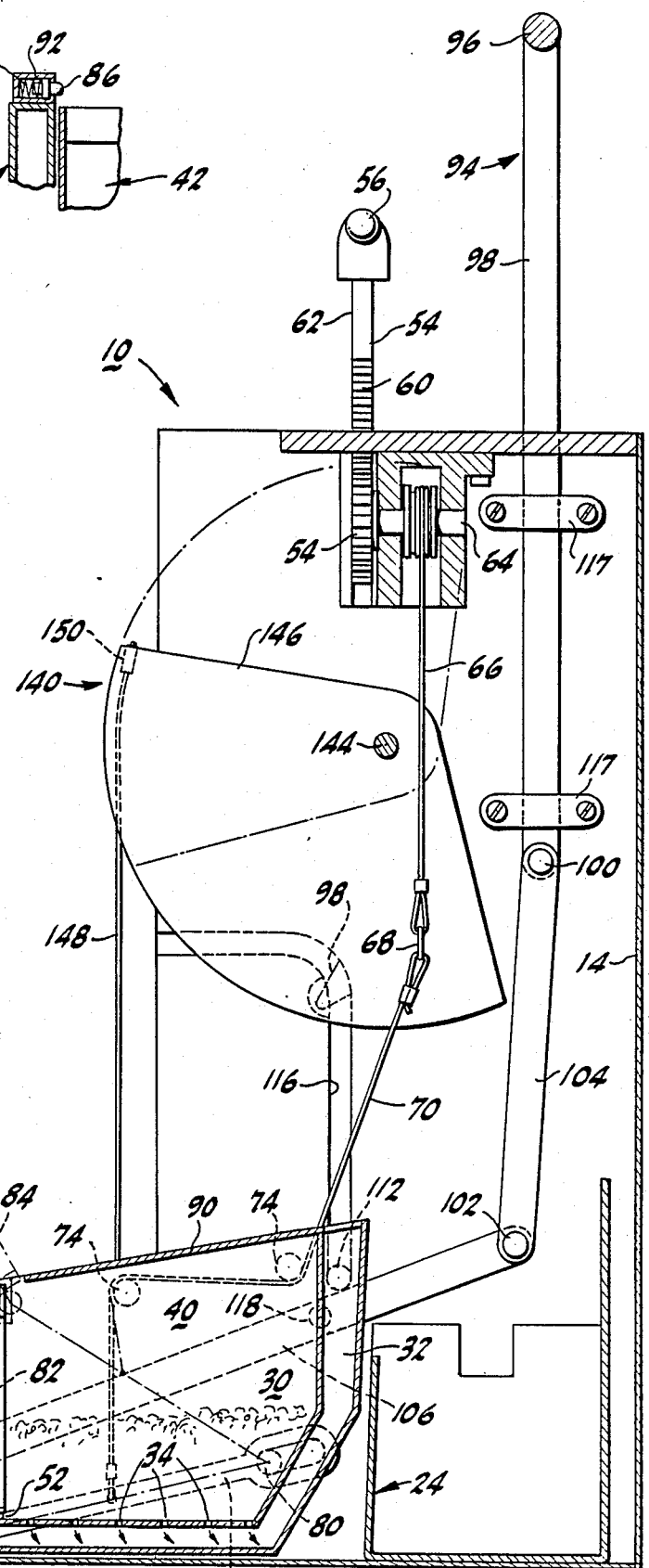
FIG. 4 is a cross sectional side view taken along the lines 4—4 in FIG. 3.

The litter container 20 as shown most clearly in FIG. 4 is constructed with an upper or inner compartment 30 and a lower or outer compartment 32 which forms a basin for collection of liquids that pass through a series of holes 34 in the bottom of the inner compartment 30. The inner compartment 30 contains a deep layer of non absorbent granular material 36 which is sized slightly larger then the holes 34 to prevent their passage from the inner compartment to the outer compartment. The litter container 20 is constructed with an open portion 38 and a covered portion 40. Seated in the open portion 38 is a screen strainer 42 which has an open end wall 44, side walls 46, as shown in FIGS. 3 and 7, and a bottom screen 48 formed by a series of elongated rods 50 connected to a cross rod 52 at the open end of the strainer 42. The rods 50 are spaced sufficiently close together to collect solid fecal matter while allowing the granular material 36 to pass between adjacent rods 50. In its normal position for use, the litter container 20 appears to a cat to be substantially similar to the conventional litter box. The open portion 38 is sufficiently large to allow the cat to comfortably enter the litter container for deposit or of liquid or solid wastes.

Operation of the actuating mechanism 22 is a two step operation. In a first step depression of a plunger 54 by manual pushing on handle 56 rotates pinion gear 58 which engages a tooth rack 60 on the plunger shaft 62 as shown in FIGS. 3 and 4. Pinion gear 58 is connected to spindle 64 on which is wound a wire 66. Wire 66 (displaced for clarity in FIG. 4) branches at ring 68 to wires 70 which pass through guide 72 and over guides 74 to connect to the central portion of lever arm 78. Lever arm 78 has a slide connection to pivot 80 at one end and a pivotal connection to link 82 which is pivotally connected to the top of side wall 46 at pivot 84. When the plunger 54 is depressed, the wire 66 wraps on the spindle 64 and raises lever arm 78, thereby raising the screen strainer 42 until a detent pin 86 engages a dimple 88, shown in phantom in FIG. 4 in the alternate position of the strainer 42. The detent pin 86 maintains the strainer in a position in which the end of the bottom screen 48 is juxtaposed to the top cover 90 over the covered portion of the container 20. The detent pin 86 is shown in cross section in FIG. 5 being positioned in a housing 92 on the container 20, with the detent pin being biased by a small compression spring 94.

Once the screen strainer 42 has been raised to the position shown in phantom in FIG. 4, the litter container 20 can be tipped by use of a cross bar mechanism 94. The cross bar mechanism 94 has a manually operated cross bar 96 connected to two vertical link members 98 positioned proximate the side frames 12 inside the housing 18. The vertical link members 98 connect by pivotal connections 100 and 102 to intermediate link 104 and elongated end length 106. The end link 106 connects to a pivot bracket 108 that has a cross member 110 under the litter container 20 having a similar pivot bracket 108 on the other side of the litter container for connection to an identical link assemblage. The litter container 20 has two projecting bosses 112 mounted on the upper back corner of the side walls 114 of the outer compartment 32. Each boss 112 engages a track groove 116 in the side frames 12. The bosses 112 act both as pivots when positioned at the base of the track groove and as guides when the litter container 20 is displaced such that the bosses 112 are transported up the grooves during the return operation.

When the cross bar 96 is depressed, the vertical link members 98, which are retained by straps 117 and restricted to vertical motion, imparts the linear motion to the end of inter connecting link 104. End link 106 has an intermediate connection to a pivot 118 on the side frames 12 such that the end link acts as a lever arm to lift the outer end of the litter container 20 when the cross bar 96 is depressed. The litter container 20 swings upward as shown in phantom in FIG. 1 whereupon the fecal matter retained on the bottom screen 48 slides across the screen and cover 90 and is deposited into the collection box 24. To insure that the collection box is in place when the cross bar mechanism 94 is actuated, a simple locking mechanism 120 as shown in FIG. 2 is provided. The collection box 24 has its handle 26 connected to a false front 122 to match side frames 12 when the box is in place. Spacers 124 connect the false front 122 to the side wall 126 of box 24. The side wall 126, contacts a biased plate 128 loosely connected at one end by bolt 130 and alignment bolt 132 having a compression spring 133 to bias the plate 128 toward the side frame 12. Neither bolt 130 nor bolt 132 interfere with motion of the interconnecting link 104 as shown in FIG. 1. However, bolted on the plate 128 is a machine screw 136 which is adjusted and positioned to interfere with end link 106 when the box is removed and the plate 128 is displaced toward the side frame 12. In this manner depression of the cross bar 96 will be inhibited. The screw and washer assembly 138 mounted on the false front 122 of the collection box 24 provides a stop for inserting the collection box as the washer assembly will in part contact the side frame 12, As shown in FIGS. 1 and 2.

Figure 8:
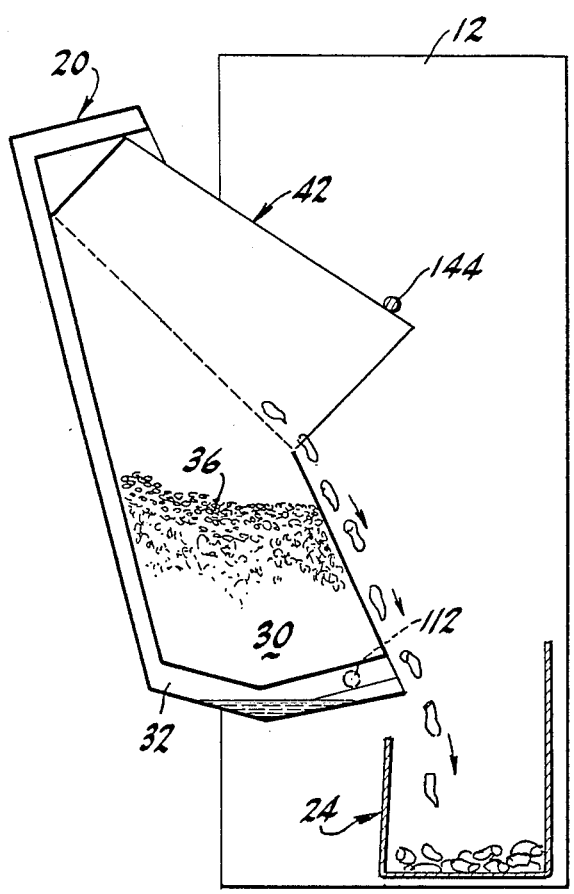
FIG. 8 is a schematic view of the box unit in a first sequence of operation.
Figure 9:
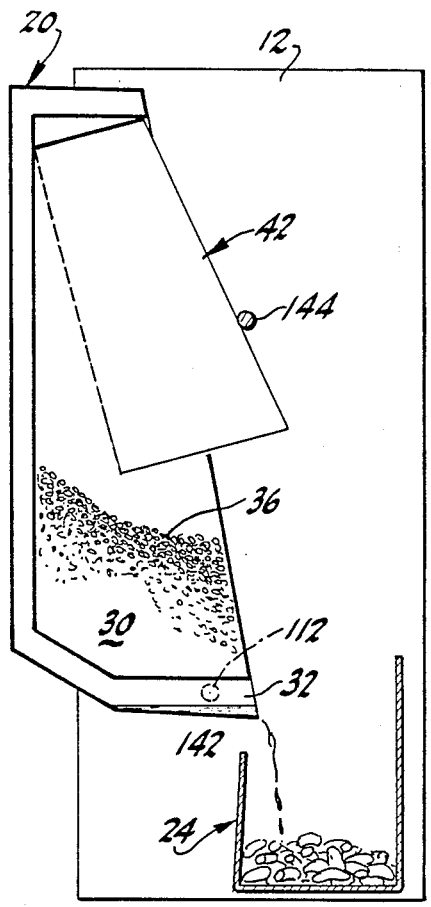
FIG. 9 is the box unit in a second sequence of operation.
Figure 10:
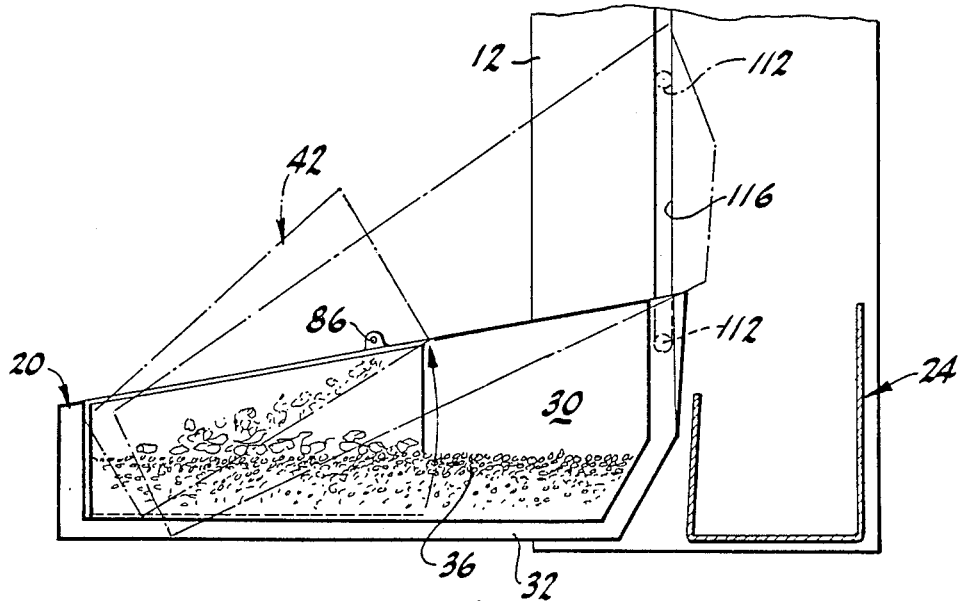
FIG. 10 is the box unit in a third sequence of operation.

The cross bar mechanism 94 operates in conjunction with a delay mechanism 140 which comes into operation when it is desired to return the litter box in it to its operable position. As shown in the schematic views of FIGS. 8–10 when the litter box has been raised to the position that results in discharge of the solid material collected by the screen strainer 42, the granular material 36 shifts to the back of the upper compartment 30 such that all of the liquid drains to the bottom and back of the lower or outer compartment 32. When the final upright position is reached as shown in FIG. 9 the back edge 142 of the lower or outer compartment 32 is positioned over the collection box 24 the collected liquid waste pours into the collection box. Concurrently, the top of the side walls 46 of the screen strainer 42 contacts the cross shaft 144 of the delay mechanism 140. This contact forces the detent pin 86 to be released from the dimple 88 such that the screen strainer 44 will drop back against the inner compartment 30 when the litter container begins to be returned to its operational position. It is to be noted that the granular material 36 has shifted out of the way such that the screen strainer 42 can reseat on the bottom of the inner compartment.

The delay mechanism 140 includes a pair of spaced cams mounted on the ends of the cross shaft 144 with support wires having end connectors 150 and 152 for connecting to the top of the cam 146 and the bottom part of the litter container 20. The cams 146 have a grooved, arcuate edge 154 which allow the support wires 148 to wrap and unwrap from the cams when the litter container 20 is raised or lowered. The cams 146 as shown in FIG. 1, are connected to a tension spring 156 connected at one end to a pin 158 in side frame 12 and mounted at its other end to a pin 160 on a crank member 162 connected to the shaft 144 by a nut and washer assembly 164. The tension spring 156 compensates for the weight of the litter container 20 and contained granular material 36 such that operation of the cross bar mechanism 94 requires minimal application of force. The lever member 162 also includes an extension 166 connected to an air cylinder 168 having a connection to the outside of one of the side frames 12 by pin 170. The air cylinder 168 coacts with the tension spring 156 to provide a smooth cushioned motion to the actuation of the litter container, on its descent to the base pad 16.

Figure 6:
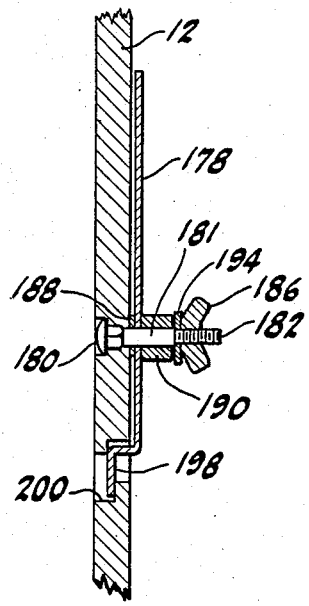
FIG. 6 is a cross sectional detailed view taken on the lines 6—6 in FIG. 1.

When the litter container 20 is raised to the position shown in FIG. 9 by actuation of the cross bar mechanism 94, the tension spring causes the cam 146 to rotate maintaining tension on the support wires 148. In the upright position a detent cam 172 has rotated together with the support wire cams 146 such that a detent 174 engages a notch 176 on a locking arm 178. The locking arm 178 shown in cross section in FIG. 6 is pivotally mounted to one of the side frames 12 by a pin assembly that is constructed with a bolt 180 having a thick shaft 181 and a thinner threaded end 182 for seating a washer 194 and wing nut 186 with spacers 188 and 190 allowing free pivot of the locking arm 178. The locking arm 178 is biased by a tension spring 192 connected to pin 194 on the side frame 12 and hole 196 on an extension 198 of the locking arm 178. When the support wires 148 are wrapped on the cams 146 when the container is lifted, detent 174 engages the notch 176 to lock the delay mechanism 140 in its wrapped position. The litter container will shift its position when the cross bar mechanism 94 is raised and the front end of the container is dropped to the base pad as shown in phantom in FIG. 10. In this tilted position the granular material 36 has spread evenly back across the inner compartment 30 covering the bottom and the screen strainer 42. With the litter container 20 in the rear raised position shown in phantom in FIG. 10, the locking arm 178 can be automatically released as the container 20 is pulled forward and down tracking the bosses 112 up grooves 116. At the time the front edge of the container 20 reaches the pad 16, one of the bosses 112 contacts and displaces the tip 179 of locking arm 178 allowing the cams 146 to rotate and the wires 148 to unwrap such that the back end of the litter container 20 gently seats onto the base pad 16 in the position shown in FIG. 10.

Since the litter container 20 is only seated on the cross member 110 of the cross bar mechanism it can be removed from the housing 118 by disconnecting the looped wire on the end connectors for the support wires 148 and displacing the extension 198 of the locking arm 178 into a notch 200 in the side frame 12 clearing the track groove 116 such that the litter container 20 can be lifted up and out the housing 118. With the litter container removed the container can be easily washed and the gravel replaced if desired. Generally, the gravel is coated with a non-previous material such that even after long use the gravel can be used, rinsed and replaced without emitting offensive odors. As noted, the gravel can be periodically sprayed with a odor mask and disinfectant while seated in the inner or upper compartment of the container. The liquid rinse will simply seep through the granular material 36 and be collected in the lower compartment of the liquid container along with any liquid waste from the household pets.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A litter box for cats and other household pets comprising:
   (a) a container having walls and a bottom with holes for draining liquids;
   (b) a substantially impervious granular material contained in the container covering the bottom of the container and sized larger than the container bottom holes;
   (c) a screen member with screening elements spaced to pass the granular material and collect solid waste material typically discharged from a household pet using the litter box, the screen member being positioned over the container bottom under the granular material;
   (d) liquid receiving means for receiving liquids discharged into the container and passing through the holes in the container bottom;
   (e) waste collection means for receiving solids from the container and liquids from the liquid collection means;
   (f) actuation and deposit means for actuating the screening of solids from the container and the draining of liquids from the liquid collection means, and depositing screened solids and drained liquids into the waste collection means.

2. The litter box of claim 1 wherein the liquid collection means comprises a compartment under the bottom of the container adapted to collect and hold liquids.

3. The litter box of claim 1 wherein the actuation and deposit means includes a first mechanism having means for passing the screen member through the granular material, separating the solid material from the granular material.

4. The litter box of claim 3 having a housing structure, on which the first mechanism is mounted, the first mechanism including lift means connected to the screen member for lifting the screen member through the granular material.

5. The litter box of claim 4 wherein the lift means comprises an actuating handle, a spindle, a rack and pinion mechanism connecting the actuating handle to the spindle and adapted to rotate the spindle on displacement of the handle, and, a connecting means for connecting the screen member to the spindle.

6. The litter box of claim 5 wherein the screen member is constructed with sides, a bottom comprised of a series of spaces and an open end, and, said container is constructed with a top open portion and a top covered portion, the screen member being positioned on the container bottom below the open portion, said lift means including link members connected to said wire connecting means and to the sides of the screen member, said link members being adapted to raise the open end of the screen member to the top covered portion of the container on actuation of said first mechanism.

7. The litter box of claim 6 including cooperating detent retaining means on the container and on the screen member for retaining the open end of the screen member at the top covered portion of the container.

8. The litter box of claim 3 wherein the actuation and deposit means includes a second mechanism having means for tilting the container and screen member in a manner adapted to deposit liquids from the liquid collection means and screened solids from the screen member into the waste collection means.

9. The litter box of claim 8 wherein the actuation and deposit means includes a third mechanism for distributing granular material across the container bottom over the screen member.

10. The litter box of claim 8 wherein the container includes walled front, back, sides, and a top with an open portion proximate the front and a cover portion proximate the back, the waste collection means being positioned adjacent the container back, wherein the second mechanism includes a frame structure with a cross bar and linkage assembly, the cross bar and linkage assembly having a hand operated cross bar, vertical link members connected to the cross bar at one end and pivotally connected to a link unit with end links pivotally connected to the frame structure in the manner of levers arranged on each side of the container, the end links having an interconnecting cross member under the container, whereby on manual depression of the cross bar the container is tilted upward such that the back wall of the container is over the liquid collection means in a position that drains liquids from the liquid receiving means and deposits separated solids from the screen into the collection means.

11. The litter box of claim 10 wherein the actuating and deposit means includes: a third mechanism comprising a support means for retaining the back of the container elevated above the waste collection means when the front is returned to a lowered position, whereby the granular material spreads over the screen member; and, a release means for releasing the back of the container to return the container to a usable position.

12. The litter box of claim 11 wherein the support means comprises a cam assembly with support cams on a shaft connected to the frame structure and a wire assembly with suspension wires connected to the cam assembly and the container, the cam assembly having bias means for winding the wires on the cams as the container is raised by the cross bar and linkage assembly.

13. The litter box of claim 11 wherein the release means comprises a notched detent lever with a bias spring mounted on the frame structure and a detent cam with a detent mounted on the shaft of the cam assembly.

* * * * *